United States Patent
Løseth et al.

(10) Patent No.: US 10,677,951 B2
(45) Date of Patent: Jun. 9, 2020

(54) METHOD OF AND APPARATUS FOR PROCESSING CSEM DATA, PROGRAM, STORAGE MEDIUM, COMPUTER AND USE OF METHOD

(75) Inventors: Lars Ole Løseth, Trondheim (NO); Lasse Amundsen, Trondheim (NO); Arne Johannes Kaaijk Jenssen, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 317 days.

(21) Appl. No.: 13/145,277

(22) PCT Filed: Jan. 19, 2010

(86) PCT No.: PCT/EP2010/050589
§ 371 (c)(1),
(2), (4) Date: Sep. 21, 2011

(87) PCT Pub. No.: WO2010/084117
PCT Pub. Date: Jul. 29, 2010

(65) Prior Publication Data
US 2012/0011130 A1  Jan. 12, 2012

(30) Foreign Application Priority Data
Jan. 20, 2009 (GB) .................................. 0900906.9

(51) Int. Cl.
*G01V 3/08* (2006.01)

(52) U.S. Cl.
CPC ........ *G01V 3/083* (2013.01); *G01V 2003/086* (2013.01)

(58) Field of Classification Search
CPC .......... G01V 3/083; G01V 3/12; G01V 11/00; G01V 1/305; G01V 2003/086
USPC ............................................. 702/7, 748, 127
See application file for complete search history.

(56) References Cited

U.S. PATENT DOCUMENTS 5,657,756 A * 8/1997 Vrba et al. .................... 600/409
2008/0015809 A1  1/2008 Alumbaugh et al.

FOREIGN PATENT DOCUMENTS

| WO | WO 2007/094676 A1 | 8/2007 |
| WO | WO 2007/097787 A2 | 8/2007 |
| WO | WO 2008/062024 A2 | 5/2008 |
| WO | WO 2008062024 A2 * | 5/2008 |
| WO | WO 2008/122554 A2 | 10/2008 |

OTHER PUBLICATIONS

L. M. MacGregor et al., "The RAMESSES experiment—III. Controlled-source electromagnetic sounding of the Reykjanes Ridge at 57°45'N", Geophysical Journal International, vol. 135, No. 3, XP-002580228, 1998, pp. 773-789.

* cited by examiner

Primary Examiner — Yoshihisa Ishizuka
(74) Attorney, Agent, or Firm — Birch, Stewart, Kolasch & Birch, LLP

(57) ABSTRACT

A method of processing controlled source electromagnetic (CSEM) data is provided for reducing the airwave contribution. CSEM data are acquired, for example using a conventional towed source (4) and receiver (5) arrangement. The recorded data are weighted in accordance with the geometrical spreading of the airwave component. The differences between pairs of weighted data records are then formed.

18 Claims, 5 Drawing Sheets

METHOD OF AND APPARATUS FOR PROCESSING CSEM DATA, PROGRAM, STORAGE MEDIUM, COMPUTER AND USE OF METHOD

The present invention relates to a method of processing controlled source electromagnetic data. The present invention also relates to a program for controlling a computer to perform such a method, a computer readable storage medium containing such a program and a computer containing such a program. The present invention further relates to an apparatus arranged to perform such a method and the use of such a method to reduce airwave contribution.

In the marine controlled source electromagnetic (CSEM) method for hydrocarbon exploration, also referred to as SeaBed Logging (Ellingsrud et al., 2002; Eidesmo et al., 2002), the so-called airwave may represent a problem for interpreting the subsurface response. The term "airwave" refers to the signal that diffuses vertically upwards from the source to the sea surface, then propagates through the air at the speed of light with no attenuation, before diffusing back down through the seawater column to the sea bottom. In addition, there are the effects of coupling to the subsurface on the source and receiver sides by vertically travelling multiple reflected signals (Nordskag and Amundsen, 2007; Løseth, 2007). Various methods have been proposed to remove the airwave from the total field response, e.g. modelling of the water-layer's airwave effect and then subtracting it from the field data (Lu et al., 2005), applying electromagnetic field decomposition into upgoing and downgoing components (Amundsen et al., 2006), or removing the airwave by weighting inline and broadside data (Løseth and Amundsen, 2007).

According to a first aspect of the invention, there is provided a method of processing controlled source electromagnetic data, comprising: weighting a plurality of data records in accordance with geometrical spreading of an airwave component; and forming a difference between the weighted data records of at least one pair of the weighted data records.

For horizontal field component data records responsive to at least one horizontal electric dipole source, the data records may be weighted according to the cube of source-receiver offset.

For vertical magnetic field data records responsive to at least one horizontal electric dipole source, the data records may be weighted according to the fourth power of source-receiver offset.

According to a second aspect of the invention, there is provided a method of processing controlled source electromagnetic data, comprising forming a first difference between the data records of each of a plurality of pairs of data records, weighting the first differences in accordance with geometrical spreading of an airwave component, and forming a second difference between the weighted first differences of at least one pair of the weighted first differences.

For horizontal field component data records responsive to at least one horizontal electric dipole source, the first differences may be weighted according to the fourth power of source-receiver offset.

For vertical magnetic field data records responsive to at least one horizontal electric dipole source, the first differences may be weighted according to the fifth power of source-receiver offset.

The method may comprise forming a plurality of differences or second differences to provide a difference field and integrating the difference field.

According to a third aspect of the invention, there is provided a program for controlling a computer to perform a method according to the first or second aspect of the invention.

According to a fourth embodiment of the invention, there is provided a computer-readable storage medium containing a program according to the third aspect of the invention.

According to a fifth aspect of the invention, there is provided a computer containing a program according to the third aspect of the invention.

According to a sixth aspect of the invention, there is provided an apparatus arranged to perform a method according to the first or second aspect of the invention.

According to a seventh aspect of the invention, there is provided use of a method according to the first or second aspect of the invention to reduce airwave contribution in data.

It is thus possible to provide a new technique for removing the airwave signal in CSEM data. An advantage of the new technique is that the conventional inline source-receiver configuration is sufficient. For common source points, the properly rotated (cf. Løseth and Kritski, 2008) time-domain field components are weighted with the geometrical spreading factor of the airwave before the difference field, using two nearby receivers, is calculated. The two receivers preferably have a separation distance above a certain offset in order to produce data above the noise floor. The weighted difference field is scaled by the inverse geometrical spreading factor of the airwave before the derived difference field components are processed in the same way as for standard CSEM data.

The attenuation or removal of the airwave component may also be done in the common receiver domain. In this case, nearby located pairs of receivers are not required. For both the common receiver and source domain procedures, it may be advantageous to perform the calculations in the time domain.

Calculation of the difference field by using two nearby receiver responses may help to reduce the amount of correlated noise in the data (Løseth et al., 2008). If the data are weighted before the differences are formed, the reduction of correlated noise is suboptimal. A way of overcoming this can be to form first order differences without weighting the data, and then perform the airwave removal by forming new second order differences using the first order differences. This involves using data from three receivers instead of two.

Moreover, the resulting field components (at least substantially) void of the airwave may be integrated in order to make the result comparable with the original total field. This also enables estimates of the airwave contribution to the original measured field component.

The invention will be further described by way of example, with reference to the accompanying drawings, in which.

Figure 5A:
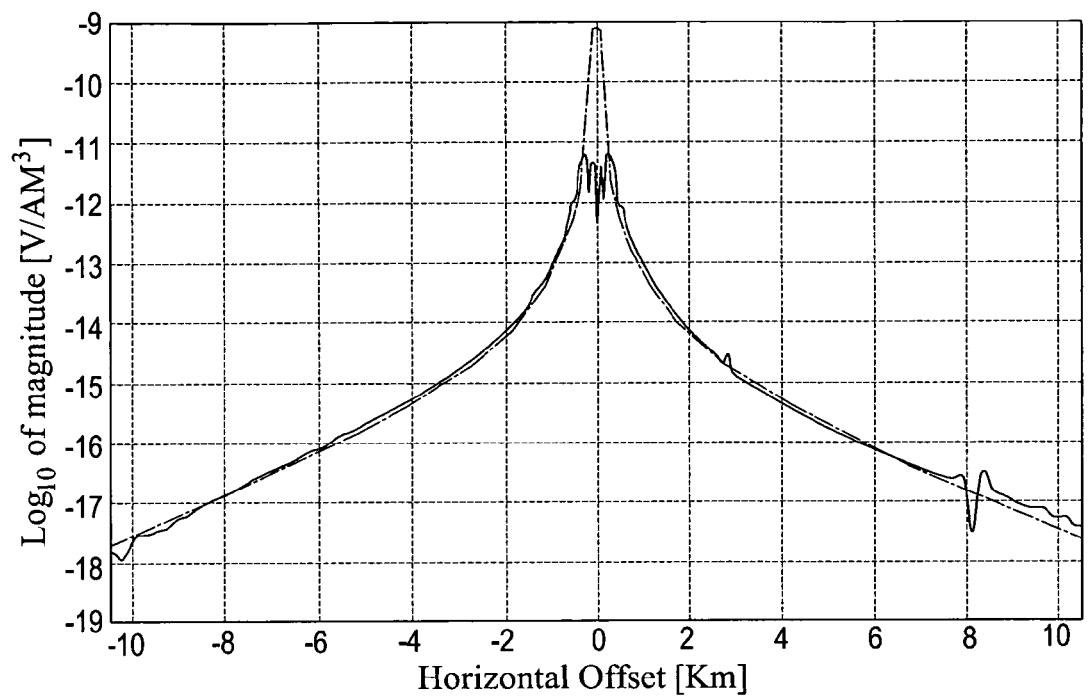
Figure 5B:
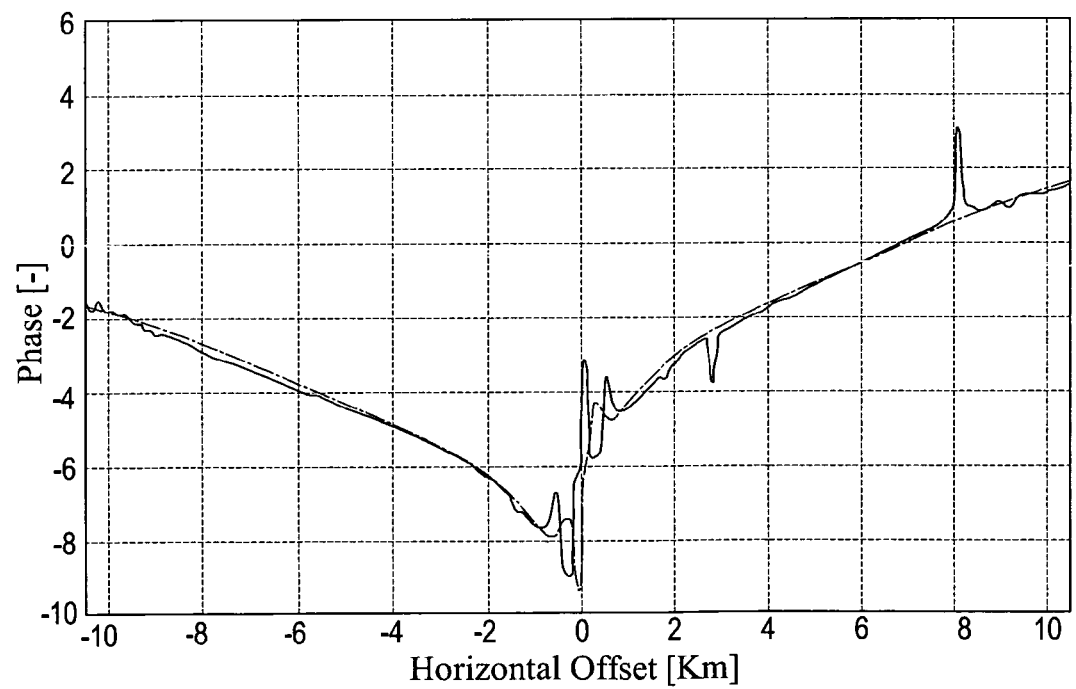
Figure 6A:
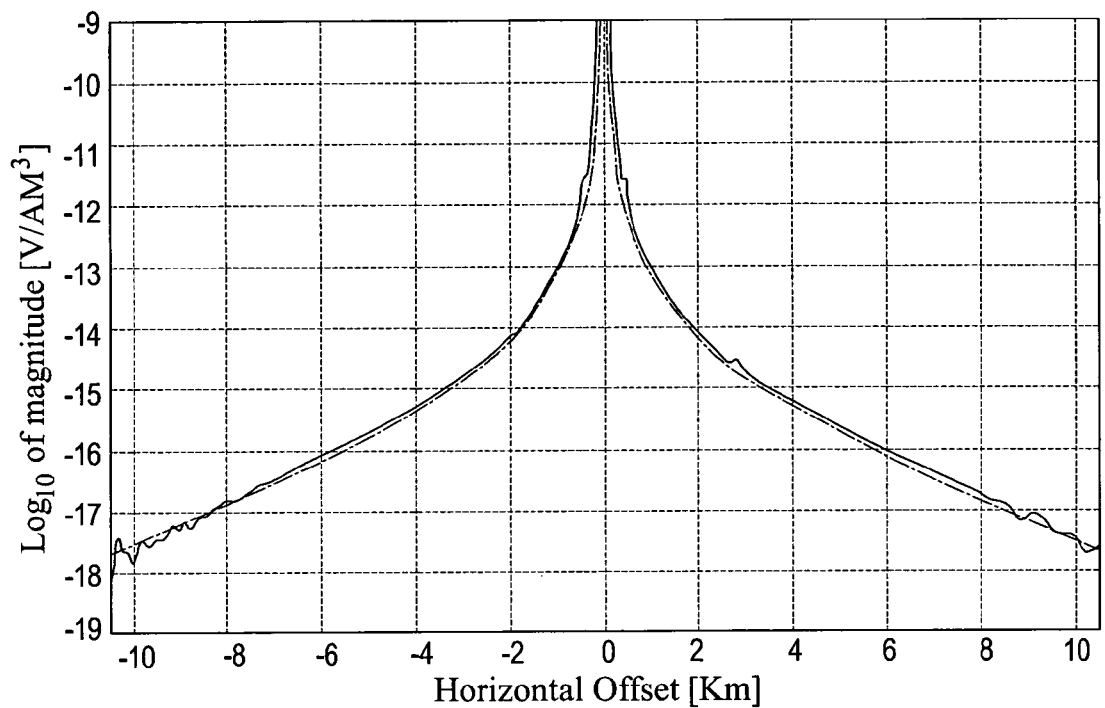
Figure 6B:
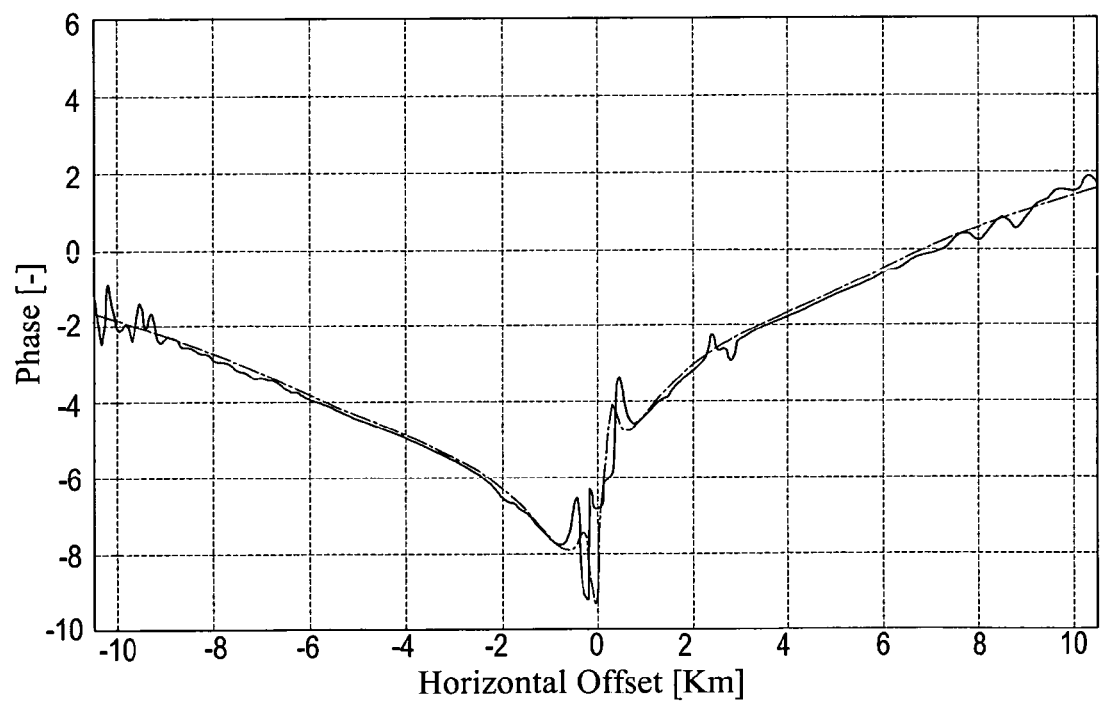

FIGS. 5a and 5b are graphs showing MVO and PVO, respectively, with the solid line showing the weighted difference-field components using common source point data and the broken line showing the corresponding data from the synthetic model; and FIGS. 6a and 6b are graphs showing MVO and PVO, respectively, with the solid line showing the weighted difference-field components using common receiver point data and the broken line showing the corresponding data from the synthetic model.

A new technique is provided for removing or reducing the airwave in marine CSEM data. One embodiment uses pairs of receivers or pairs of source points along the towline and processes the horizontal electric and/or magnetic fields in terms of their weighted differences along the towline. The weights are related to the geometrical spreading of the airwave component in the data. This geometrical spreading factor in the horizontal field components equals to a very good approximation the horizontal offset (source-receiver distance) to the power of three. Thus, the horizontal electric and magnetic field components in the common source or receiver domain should be weighted with the horizontal offset to the power of three before the differences along the towline direction of the weighted field components are calculated. The derived difference field components contain almost no airwave signal. In order to remove correlated noise as well as the airwave signal, one could first calculate difference data without weights in the common source domain, and then use the resulting data to perform a second order difference using weights. In this case, the apparent geometrical spreading of the airwave changes and the weights should be equal the horizontal offset to the power of four. Moreover, the weighted differences may be integrated in order to obtain an estimate of the total field void of the airwave. Additionally, the airwave contribution to the total field may also be estimated.

In the following, $Il$ is the dipole moment of a dipole source and $\beta$ is its azimuthal angle. Variables I describe the propagation of a spectrum of plane-wave components for TE and TM modes. The theoretical background to the technique will be described first.

For simplicity consider the CSEM experiment in a plane-layered medium. The electromagnetic field components from a horizontal electric dipole source are then (Løseth and Ursin, 2007):

$$E_x = -\frac{Il}{4\pi}\left[I_{A0}^{TM}\cos^2\beta + I_{A0}^{TE}\sin^2\beta + \frac{1}{\rho}(I_{A1}^{TE}-I_{A1}^{TM})\cos 2\beta\right], \quad (1a)$$

$$E_y = -\frac{Il}{4\pi}\cos\beta\sin\beta\left[I_{A0}^{TM} - I_{A0}^{TE} + \frac{2}{\rho}(I_{A1}^{TE}-I_{A1}^{TM})\right], \quad (1b)$$

$$H_x = +\frac{Il}{4\pi}\cos\beta\sin\beta\left[I_{D0}^{TM} - I_{D0}^{TE} + \frac{2}{\rho}(I_{D1}^{TE}-I_{D1}^{TM})\right], \quad (1c)$$

$$H_y = -\frac{Il}{4\pi}\left[I_{D0}^{TM}\cos^2\beta + I_{D0}^{TE}\sin^2\beta + \frac{1}{\rho}(I_{D1}^{TE}-I_{D1}^{TM})\cos 2\beta\right], \quad (1d)$$

$$E_z = +\frac{Il}{4\pi}\cos\beta I_{D2}^{TM}, \quad (1e)$$

$$H_z = +\frac{Il}{4\pi}\sin\beta I_{A2}^{TE}, \quad (1f)$$

The expressions for the airwave, in the simple case of constant water conductivity $\sigma$, are:

$$I_{A0}^{a,TE} \sim \frac{2e^{ik(d_s+d_r)}}{\sigma\rho^3} \frac{1+R_{sb}^s e^{2ikh_s}}{1-R_{sb}^s e^{2ik(d_s+h_s)}} \frac{1+R_{sb}^r e^{2ikh_r}}{1-R_{sb}^r e^{2ik(d_r+h_r)}}, \quad (2a)$$

$$I_{D0}^{a,TE} \sim \frac{2e^{ik(d_s+d_r)}}{ik\rho^3} \frac{1+R_{sb}^s e^{2ikh_s}}{1-R_{sb}^s e^{2ik(d_s+h_s)}} \frac{1+R_{sb}^r e^{2ikh_r}}{1-R_{sb}^r e^{2ik(d_r+h_r)}}, \quad (2b)$$

$$I_{A2}^{a,TE} \sim -\frac{6e^{ik(d_s+d_r)}}{k^2\rho^4} \frac{1+R_{sb}^s e^{2ikh_s}}{1-R_{sb}^s e^{2ik(d_s+h_s)}} \frac{1+R_{sb}^r e^{2ikh_r}}{1-R_{sb}^r e^{2ik(d_r+h_r)}}, \quad (2c)$$

where $\rho$ is the horizontal offset (source-receiver distance), $k=\sqrt{i\omega\mu\sigma}$ is the wavenumber with angular frequency $\omega$ and magnetic permeability $\mu$, $d_s$ is the source depth below the seasurface, $h_s$ is the source height above the seabed, $d_r$ is the receiver depth, and $h_r$ is the receiver height. Moreover $R_{sb}^s$ and $R_{sb}^r$ are the subsurface reflection coefficients at the seabed for vertically travelling fields at the source and receiver locations, respectively. We furthermore have the following relations (Løseth and Amundsen, 2007):

$$I_{A1}^{a,TE} \cong -\rho I_{A0}^{a,TE} \text{ and } I_{D1}^{a,TE} \cong -\rho I_{D0}^{a,TE}. \quad (3)$$

From the expressions in equations 2 and 3, we see that the geometrical spreading of the airwave component for the horizontal field components goes like the horizontal offset to the inverse power of three. Thus, by weighting the data with the horizontal offset cubed, and then forming the differences, we are able to remove the effect of the main airwave component in the resulting data. In cases where $\beta$ changes between offset locations, this must be taken into account in the weighting scheme.

For an inline source-receiver configuration let $x_1^r$ and $x_2^r$ denote the positions of receivers $Rx_1$ and $Rx_2$, respectively, and let $\rho_1$ and $\rho_2$ denote the offsets to common source points at $x^s$ for receivers $Rx_1$ and $Rx_2$, respectively. Then the resulting difference-field components at the midpoint $x_{12}^r$ between the receivers become:

$$\frac{\Delta E_x^a(\rho_{12})}{\Delta x} = \frac{1}{\rho_{12}^3(x_2^r - x_1^r)}\left[\rho_2^3 E_x^{Rx2}(\rho_2) - \rho_1^3 E_x^{Rx1}(\rho_1)\right], \quad (4a)$$

$$\frac{\Delta H_y^a(\rho_{12})}{\Delta x} = \frac{1}{\rho_{12}^3(x_2^r - x_1^r)}\left[\rho_2^3 H_y^{Rx2}(\rho_2) - \rho_1^3 H_y^{Rx1}(\rho_1)\right], \quad (4b)$$

where $\rho_{12}=(\rho_2+\rho_1)/2$. The weighted field differences in equation 4 are not influenced by the airwave component.

However, processing the data as described in equation 4 might not reduce the effect of correlated noise. Thus, we suggest an additional method which removes the correlated noise in a first step and then reduces the effect of the airwave component in a second step. This method requires three nearby receivers in order to form weighted second order differences, say at locations $x_1^r$, $x_2^r$, and $x_3^r$. In the first step we form horizontal differences along the towline. This reduces the effect of correlated noise in the data and also alters the way the airwave component appears in the data. In a second step, the differences of the difference data are calculated. The second-order differences must be weighted by the geometrical spreading factor of the modified airwave expression in the difference-field data. The difference field components become:

$$\frac{\Delta Ex}{\Delta x} = \frac{1}{x_{j+1}^r - x_j^r}\left[E_x^{Rx_{j+1}}(\rho_{j+1}) - E_x^{Rx_j}(\rho_j)\right], \quad (5a)$$

$$\frac{\Delta Hy}{\Delta x} = \frac{1}{x_{j+1}^r - x_j^r}\left[H_x^{Rx_{j+1}}(\rho_{j+1}) - H_x^{Rx_j}(\rho_j)\right], \quad (5b)$$

where j={1,2} and the airwave component is modified as:

$$\Delta E_x^{aircomp} \approx I_{A1}^{a,TE}\left(\frac{-3}{\rho}\right)\Delta x, \quad (6a)$$

$$\Delta H_y^{aircomp} \approx I_{D1}^{a,TE}\left(\frac{-3}{\rho}\right)\Delta x, \quad (6b)$$

We can now calculate differences of the difference data in equation 5. These second order differences must be weighted by the geometrical spreading factor of the airwave in the expressions in equation 5. From equations 6 and 2 we see that this factor equals the horizontal offset to the power of four. Thus the second order weighted differences become:

$$\frac{\Delta^2 E_x^a(\rho_2)}{\Delta x^2} = \frac{1}{\rho_2^4(x_{23}^r - x_{12}^r)}\left[\rho_{23}^4\frac{\Delta E_x^a(\rho_{23})}{\Delta x} - \rho_{12}^4\frac{\Delta E_x^a(\rho_{12})}{\Delta x}\right], \quad (7a)$$

$$\frac{\Delta^2 H_y^a(\rho_2)}{\Delta x^2} = \frac{1}{\rho_2^4(x_{23}^r - x_{12}^r)}\left[\rho_{23}^4\frac{\Delta H_y^a(\rho_{23})}{\Delta x} - \rho_{12}^4\frac{\Delta H_y^a(\rho_{12})}{\Delta x}\right], \quad (7b)$$

Neglecting removal of correlated noise, we can also calculate the difference field void of the main airwave component in the common receiver domain. In this case, let $x_0^r$ denote the location of the receiver $Rx_0$ and $\rho_1$ and $\rho_2$ denote the offsets to two nearby source points $Tx_1$ and $Tx_2$ at $x_1^s$ and $x_2^s$, respectively. Then the weighted difference field is calculated as:

$$\frac{\Delta E_x^{a'}(\rho_{12})}{\Delta x} = \frac{1}{\rho_{12}^3(x_2^s - x_1^s)}\left[\rho_2^3 E_x^{Tx_2}(\rho_2) - \rho_1^3 E_x^{Tx_1}(\rho_1)\right], \quad (8a)$$

$$\frac{\Delta H_y^{a'}(\rho_{12})}{\Delta x} = \frac{1}{\rho_{12}^3(x_2^s - x_1^s)}\left[\rho_2^3 H_y^{Tx_2}(\rho_2) - \rho_1^3 H_y^{Tx_1}(\rho_1)\right], \quad (8b)$$

If a broadside source-receiver configuration is used, it is still possible to use the method of removing the airwave component by calculating weighted difference-field components. In this case the $H_z$-component can also be evaluated. For the $H_z$-component, the geometrical spreading factor is proportional to the horizontal offset to the power of four, cf. equation 2.

The basic relation for removing the airwave for the horizontal field components, written out in terms of differences in equations 4 and 8, can be summarized in the expression:

$$\varepsilon^{noAir} \approx \frac{1}{\rho^3}\frac{\partial}{\partial \rho}[\rho^3 E(\rho)] = \frac{3}{\rho}E(\rho) + \frac{\partial E(\rho)}{\partial \rho}, \quad (9)$$

Since the dominating offset dependency is in terms of the inverse horizontal offset to the power of three, cf. equation 2. The expressions in equation 9 (and thus also in equations 4 and 8) can be integrated in order to obtain an expression for the total field void of the airwave:

$$E^{noAir}(\rho) \approx \int^{\rho} dr \frac{1}{r^3}\frac{\partial}{\partial r}[r^3 E(r)] = \int^{\rho} dr \frac{3}{r}E(r) + \frac{\partial E(r)}{\partial r} \quad (10)$$

In the integration, we ideally need a reference point, i.e. a constant, in order to obtain the optimal estimate of the field without airwave. There are several possibilities for estimating this constant. One option is to assume that the field at large offsets is dominated by the airwave and thus that the remaining field is zero here. A better choice is to estimate the airwave component at a large offset point. Another possibility is to demand that the quantity $$\sqrt{\rho\frac{\partial}{\partial \rho}\ln E} = \text{constant at large offsets.}$$

However, when using the procedure for removing the airwave before further data analysis such as inversion or normalization of the fields to a reference field, calculating the constant is not necessary. Thus, an important requirement, when analyzing measured field data that have been pre-processed by removing the airwave, is proper inter-receiver calibration (e.g. by using reciprocity).

Figure 1:
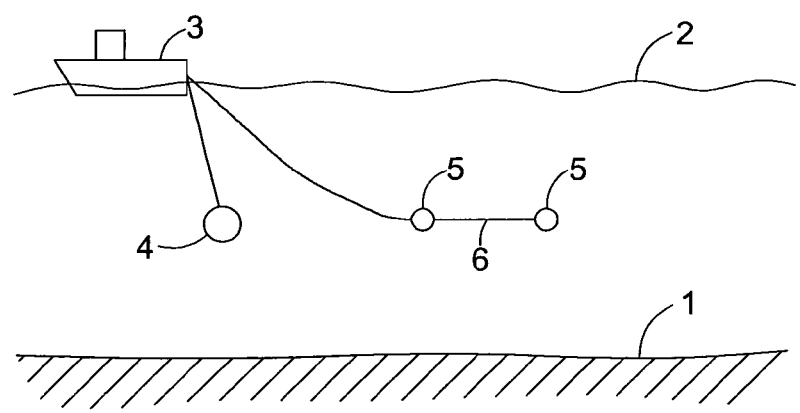
FIG. 1 is a diagram illustrating an arrangement for gathering CSEM data.

FIG. 1 illustrates a typical arrangement for gathering CSEM data in an offshore location. The seabed is shown at 1 and the sea surface is shown at 2. An exploration vessel or ship 3 tows a CSEM source for, for example in the form of a horizontal electric dipole (HED). The vessel 3 also tows receivers 5 attached to or forming part of a cable or 'streamer' 6. At least two receivers 5 are required although more may be provided as appropriate to the circumstances, and the receivers are disposed in-line with the cable 6 and the towing direction. The spacing between the receivers 5 is sufficient to provide an adequate signal-to-noise ratio for the acquired data and is typically several hundred metres.

Conversely, a single receiver may be provided and a plurality of spaced in-line sources may be used. Also, a plurality of sources and a plurality of receivers may be used.

In a typical data acquisition, the vessel 3 tows the source 4 and the receivers 5 along a plurality of paths so as to cover an area of interest. The (or each) source 4 is operated in accordance with conventional techniques and the data received by the receivers 5 passes along the streamer 6 to the vessel 3, where it is stored in digital format for subsequent processing, typically at a land-based processing centre.

Each of the receivers 5 is sensitive to one or more of the Cartesian components of the local electric and/or magnetic field response to the source 4. The locations of the source 4 and the receivers 5 is stored in association with the acquired data so as to allow subsequent mapping of the region of interest, for example in order to determine the presence, location and extent of a hydrocarbon reservoir below the seabed 1.

Figure 2:
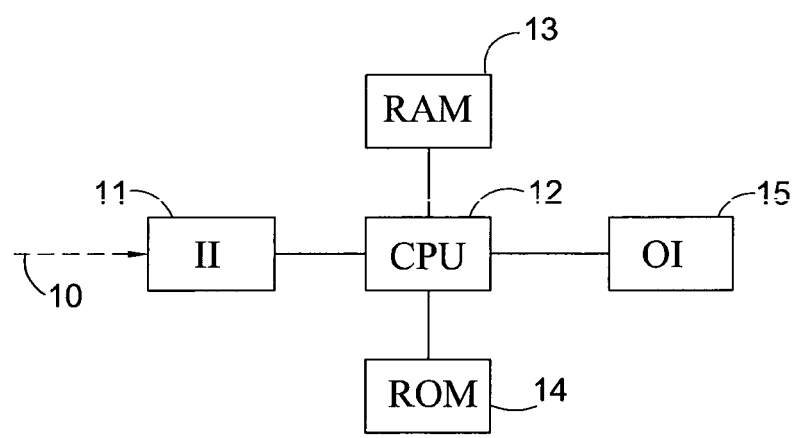
FIG. 2 is a block diagram illustrating an apparatus for processing the data according to a method constituting an embodiment of the invention.

The acquired data are processed by an apparatus which is typically in the form of a computer and an example of such a computer is shown in FIG. 2. The computer receives the stored data from the acquisition, as illustrated at 10, at an input interface (II) 11, which receives all inputs including instructions. The input interface 11 is connected to a central processing unit (CPU) 12, which is provided with random access memory (RAM) 13 typically providing volatile memory for use during the running of a program, and program storage memory 14 illustrated as read-only memory (ROM). The results of processing by the CPU 12 are supplied to an output interface (OI) 15, for example for visualisation or analysis or for further processing in accordance with the requirements of a project. The program memory 14 may receive the program for controlling the computer from a computer-readable storage medium and may include a reader for retrieving the program from the medium.

As described in detail hereinbefore, the computer performs processing, or initial processing, of the CSEM data, which is in the form of a plurality of data records. In particular, the data records are weighted in accordance with the geometrical spreading of an airwave component which, as described hereinbefore, propagates vertically upwardly from the or each source 4 to the sea surface 2, propagates through the atmosphere along the surface, and then propagates downwardly from the surface to each of the receivers 5. The difference is then formed between the weighted data records at pairs of different locations, for example different midpoints between the locations of the source 4 and the receivers 5 when the data were acquired. In the case where the data records represent horizontal field components responsive to at least one HED source 4, the data records are weighted according to the cube of the source-receiver offset. In the case of vertical magnetic field data records responsive to at least one HED source, the data records are weighted according to the fourth power of the source-receiver offset. The resulting differences are such that the airwave contribution is greatly attenuated by this processing so that the processed data represent the response with little or no contribution from the airwave. Because water is conductive, the direct wave response travelling directly from the or each source to the or each receiver is attenuated with increasing offset such that, for typical offsets during data acquisition, the contribution of the direct component provides little or insignificant contamination. Thus, the processed data largely represent the response obtained from the electromagnetic field generated by the or each source 4 passing into the earth, propagating inside the earth, and returning to the or each receiver.

In a modified form of processing the CSEM data, first differences are formed between pairs of data records without first weighting the records. These first differences are then weighted in accordance with the geometrical spreading of the airwave component and second differences are formed between pairs of the weighted first differences so as to reduce the airwave contribution in the data. For horizontal field component data records responsive to at least one HED source, the first differences are weighted according to the fourth power of the source-receiver offset. For vertical magnetic field data records responsive to at least one HED source, the first differences are weighted according to the fifth power of the source-receiver offset. This modified processing technique may be used, as described hereinbefore, to improve the signal-to-noise ratio of the processed data in addition to the reduction which is achieved in the airwave contribution.

The data processed in accordance with these techniques may be further processed as required by the specific project. Any suitable processing may be performed, including conventional CSEM processing. These techniques may be used for any application where CSEM exploration is appropriate, such as exploring for new hydrocarbon reserves or monitoring production of known hydrocarbon reserves.

Figure 3A:
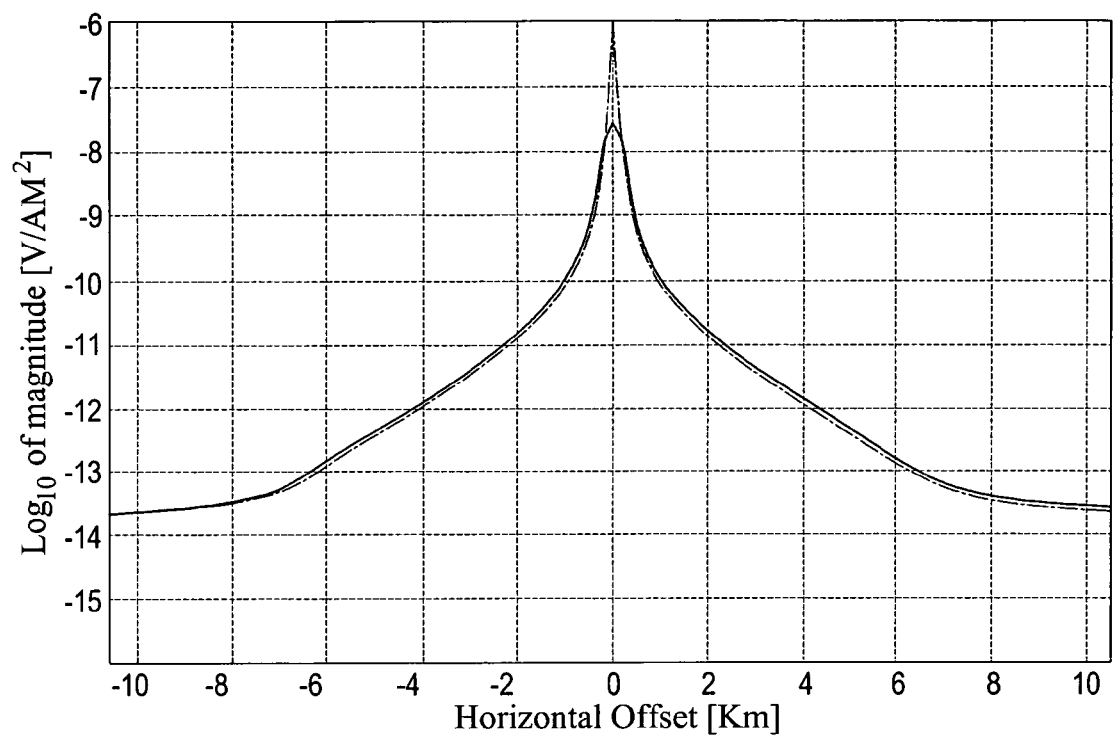
FIGS. 3a and 3b are graphs showing magnitude versus offset (MVO) and phase versus offset (PVO), respectively, for the electric field in the inline direction.
Figure 3B:
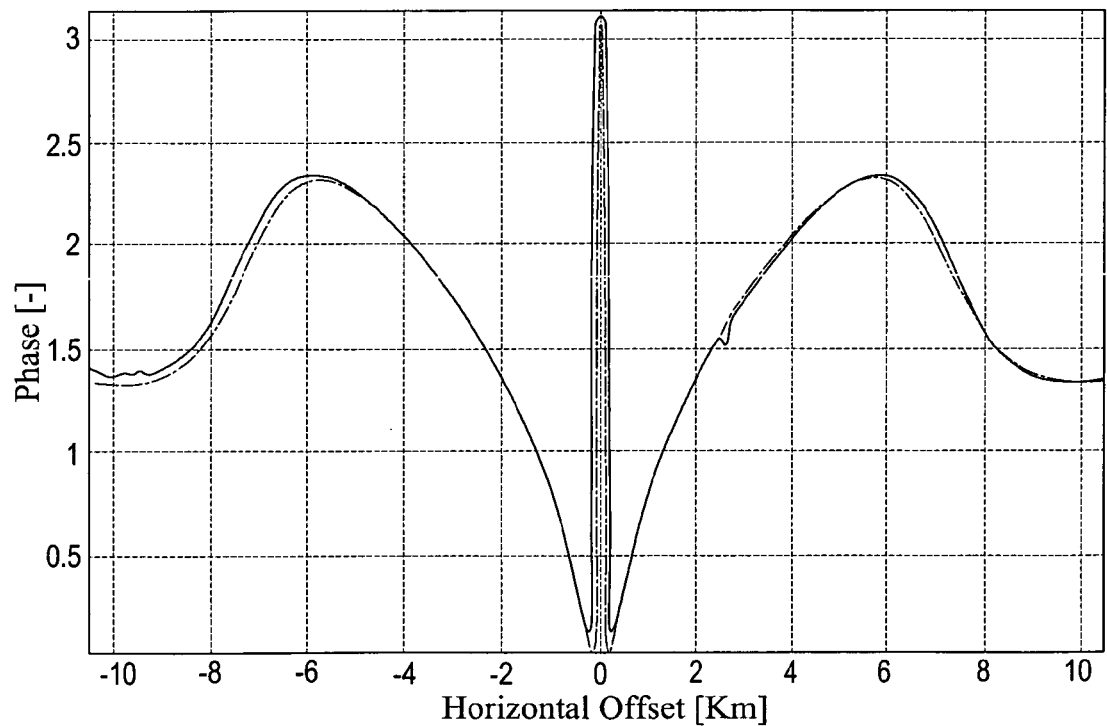

An example of the use of the present technique is illustrated for real CSEM data offshore Norway using the horizontal electric field for simplicity. FIGS. 3a and 3b show the magnitude and phase of the total electric field at frequency 0.4 Hz. The water depth was approximately 270 m and the dominant airwave signal is evident at long offsets. A "good fit" 1D model found from inverting the data was used for generating synthetic data and is illustrated by the broken line curves.

Figure 4A:
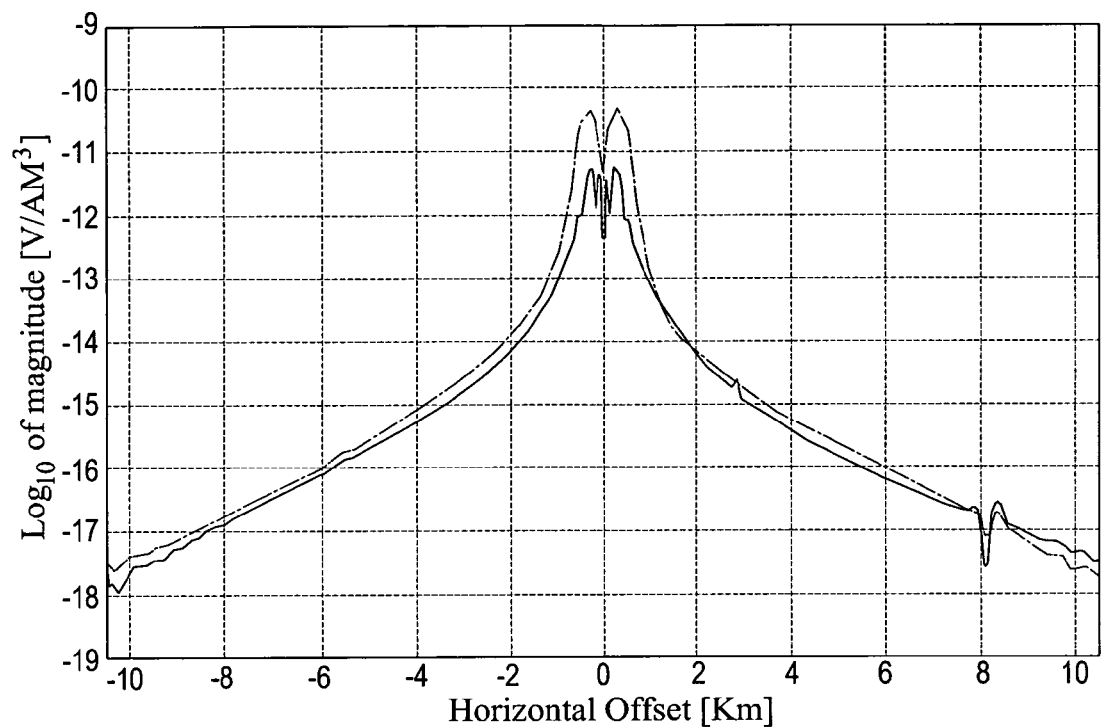
FIGS. 4a and 4b are graphs showing MVO and PVO, respectively, with the solid line representing the derived weighted difference-field and the broken line showing the derived $dE_z/dz$ field component.
Figure 4B:
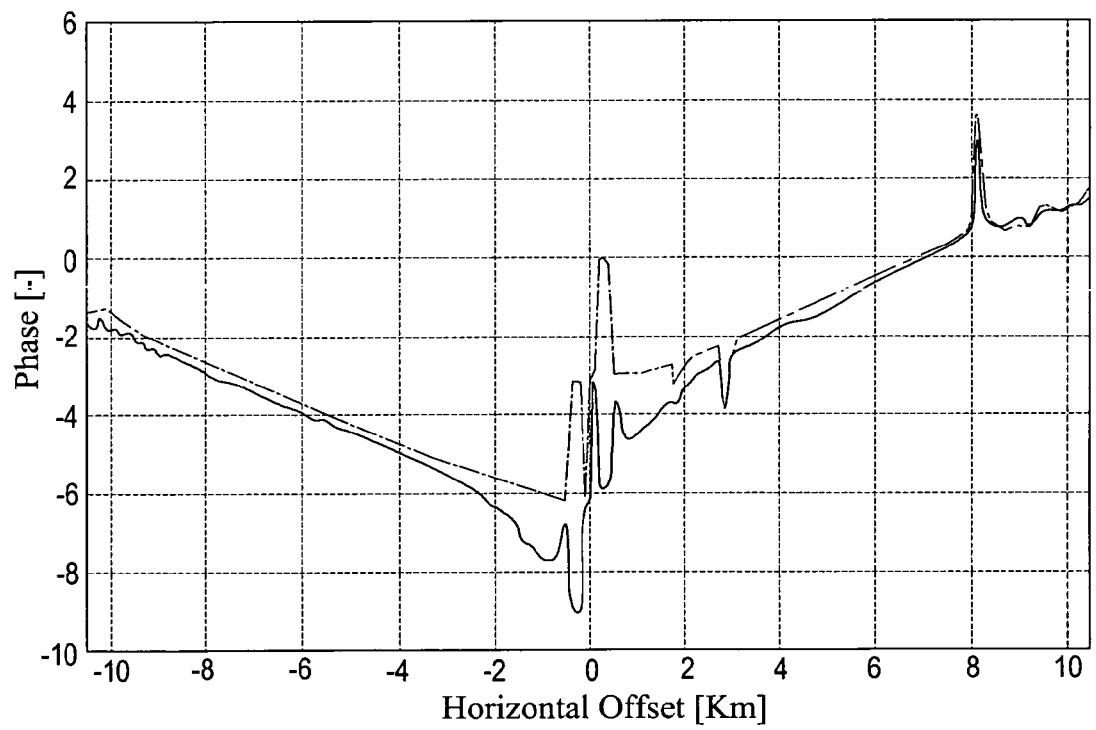

For common source point data, a receiver separation of 600 m is used when comparing the weighted difference-field components with the calculated $dE_z/dz$-field component in FIGS. 4a and 4b. The $dE_z/dz$-component contains almost no airwave and is calculated using the difference of the Ey component in the crossline direction and the difference of the Ex component along the towline direction according to Gauss' law: $dE_z/dz=-dE_x/dx-dE_y/d_y$. The calculation of $dE_z/dz$ requires one or two offline receivers in addition to two receivers on the towline in order to obtain the components dEy/dy and $dE_x/dx$, respectively. The similarity between $dE_z/dz$ and the weighted difference field in FIGS. 4a and 4b demonstrates the main airwave component has been removed by applying weighted differences using conventional inline source-receiver data only.

Finally we compare calculation of the difference field for common source points (CSP) and common receiver points (CRP) in FIGS. 5a, 5b and 6a, 6b, respectively. The difference field in the CRP domain gives better results than the difference field in the CSP domain for this data set. This is explained by inaccuracies in the inter-receiver calibration of the measured field components. Thus, to utilize the method of weighted differences in a proper manner in the CSP domain, the field measurements at each receiver should be accurately calibrated.

Thus, by calculating a weighted difference field using data from two nearby receivers or one receiver and nearby source points, it is possible substantially to remove the main airwave component in marine CSEM data. The data weights are related to the geometrical spreading factor of the airwave component within the evaluated field component.

REFERENCES

Amundsen, L., Løseth, L. O., Mittet, R., Ellingsrud, S., and Ursin, B., 2006, Decomposition of electromagnetic fields into upgoing and downgoing components: Geophysics, 71, G211-G223.

Eidesmo, T., Ellingsrud, S., MacGregor, L. M., Constable, S. C., Sinha, M. C., Johansen, S., Kong, F. N., and Westerdahl, H., 2002, SeaBed Logging (SBL), a new method for remote and direct identification of hydrocarbon filled layers in deepwater areas using controlled source electromagnetic sounding: First Break, 20, 144-152.

Ellingsrud, S., Eidesmo, T., Sinha, M. C., MacGregor, L. M., and Constable, S. C., 2002, Remote sensing of hydrocarbon layers by SeaBed Legging (SBL): Results from a cruise offshore Angola: Leading Edge, 20, 972-982.

Løseth, L. O., 2007, Modelling of Controlled Source Electromagnetic Data. PhD Thesis, NTNU.

Løseth, L. O. and Amundsen, L., 2007, Removal of air-response by weighting inline and broadside CSEM/SBL data: 77th SEG Conference, San Antonio.

Løseth, L. O. and Ursin, B., 2007, Electromagnetic fields in planarly layered anisotropic media: Geophysical Journal International, 170, 44-80.

Lu, X., Srnka, L. J., and Carazzone, J. J., 2005, Method for removing air wave effect from offshore frequency domain controlled-source electromagnetic data: W02005/010560.

Nordskag, J. and Amundsen, L., 2007, Asymptotic airwave modeling for marine controlled source electromagnetic surveying: Geophysics. 72. F249-F255.

The invention claimed is:

1. A computer implemented method, comprising the steps of:
receiving, in a first memory location, a plurality of data records comprising measured horizontal electric and magnetic field components;
generating, with a processor, weighted data records of the plurality of data records in accordance with geometrical spreading of an airwave component, in which, for horizontal field components responsive to at least one horizontal electric dipole source, the plurality of data records are weighted with different source-receiver offsets to the power of three to generate the weighted data records;
selecting, with the processor, a first weighted data record from the weighted data records, the first weighted data record having a first source-receiver offset;
selecting, with the processor, a second weighted data record from the weighted data records, the second weighted data record having a second source-receiver offset, the second source-receiver offset being different than the first source-receiver offset;
calculating, with the processor, a weighted difference field by determining a difference between the first and the second weighted data records; and
determining, at the processor, a presence of a hydrocarbon reservoir under a seabed using the weighted difference field.

2. The method as claimed in claim 1, further comprising the step of forming a plurality of differences or second differences to provide a difference field and integrating the difference field.

3. A non-transitory computer-readable storage medium with a computer program embodied thereon, the computer program, when executed on a computer processor, controlling the computer processor to perform the method as claimed in claim 1.

4. A computer containing the program as claimed in claim 3.

5. An apparatus arranged to perform the method as claimed in claim 1.

6. The method as claimed in claim 1, further comprising the step of acquiring the data records with a single horizontal electric dipole source and a pair of receivers with different source-receiver offsets.

7. The method as claimed in claim 1, further comprising the step of exploring new hydrocarbon reservoirs or monitoring production of a known hydrocarbon reservoir according to a result of the step of determining.

8. A computer implemented method, comprising the steps of:
forming, with a processor, a first difference for each pair of a plurality of pairs of data records, thereby forming a plurality of first differences, by, for each pair:
selecting, with the processor, a first data record from a respective pair, the first data record having a first source-receiver offset;
selecting, with the processor, a second data record from said respective pair, the second data record having a second source-receiver offset, the second source-receiver offset being different than the first source-receiver offset;
calculating, with the processor, said first difference between the first data record and the second data record for said respective pair;
weighting, with the processor, the plurality of first differences in accordance with geometrical spreading of an airwave component, thereby forming a plurality of weighted first differences;
forming, with the processor, a second difference between weighted first differences of at least one pair of said plurality of weighted first differences; and
determining, at a processor, a presence of a hydrocarbon reservoir under a seabed using the second difference between weighted data records,
wherein for horizontal field component data records responsive to at least one horizontal electric dipole source, the plurality of first differences are weighted according to the fourth power of source-receiver offset.

9. The method as claimed in claim 8, further comprising the step of forming a plurality of differences or second differences to provide a difference field and integrating the difference field.

10. The method as claimed in claim 8, further comprising the step of acquiring the data records with a single horizontal electric dipole source and a pair of receivers with different source-receiver offsets.

11. The method as claimed in claim 8, further comprising the step of exploring new hydrocarbon reservoirs or monitoring production of a known hydrocarbon reservoir according to a result of the step of determining.

12. A computer implemented method, comprising the steps of:
forming, with a processor, a first difference for each pair of a plurality of pairs of data records, thereby forming a plurality of first differences, by, for each pair:
selecting, with the processor, a first data record from a respective pair, the first data record having a first source-receiver offset;
selecting, with the processor, a second data record from said respective pair, the second data record having a second source-receiver offset, the second source-receiver offset being different than the first source-receiver offset;
calculating, with the processor, said first difference between the first data record and the second data record for said respective pair;
weighting, with the processor, the plurality of first differences in accordance with geometrical spreading of an airwave component, thereby forming a plurality of weighted first differences;
forming, with the processor, a second difference between weighted first differences of at least one pair of said plurality of weighted first differences; and
determining, at a processor, a presence of a hydrocarbon reservoir under a seabed using the second difference between weighted data records,
wherein for vertical magnetic field data records responsive to at least one horizontal electric dipole source, the plurality of first differences are weighted according to the fifth power of source-receiver offset.

13. The method as claimed in claim 12, further comprising the step of forming a plurality of differences or second differences to provide a difference field and integrating the difference field.

14. The method as claimed in claim 12, further comprising the step of acquiring the data records with a single horizontal electric dipole source and a pair of receivers with different source-receiver offsets.

15. The method as claimed in claim 12, further comprising the step of exploring new hydrocarbon reservoirs or monitoring production of a known hydrocarbon reservoir according to a result of the step of determining.

16. A method, comprising the steps of:

receiving, in a first memory location, a plurality of data records comprising measured horizontal electric and magnetic field components;

generating, with a processor, weighted data records of the plurality of data records in accordance with geometrical spreading of an airwave component, in which, for vertical magnetic field components responsive to at least one horizontal electric dipole source, the plurality of data records are weighted with different source-receiver offsets to the power of four to generate the weighted data records;

selecting, with the processor, a first weighted data record from the weighted data records, the first weighted data record having a first source-receiver offset;

selecting, with the processor, a second weighted data record from the weighted data records, the second weighted data record having a second source-receiver offset, the second source-receiver offset being different than the first source-receiver offset;

calculating, with the processor, a weighted difference field by determining a difference between the first and the second weighted data records; and determining, at the processor, a presence of a hydrocarbon reservoir under a seabed using the weighted difference field.

17. The method as claimed in claim 16, further comprising the step of acquiring the data records with a single horizontal electric dipole source and a pair of receivers with different source-receiver offsets.

18. The method as claimed in claim 16, further comprising the step of exploring new hydrocarbon reservoirs or monitoring production of a known hydrocarbon reservoir according to a result of the step of determining.

\* \* \* \* \*